US006856354B1

(12) United States Patent
Ohsawa

(10) Patent No.: US 6,856,354 B1
(45) Date of Patent: Feb. 15, 2005

(54) COLOR REPRODUCING SYSTEM FOR REPRODUCING A COLOR OF AN OBJECT UNDER ILLUMINATION LIGHT

(75) Inventor: Kenro Ohsawa, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/438,266

(22) Filed: Nov. 10, 1999

(30) Foreign Application Priority Data

Nov. 13, 1998 (JP) .......................................... 10-323137

(51) Int. Cl.[7] .............................................. H04N 5/222
(52) U.S. Cl. .................................... 348/370; 348/223.1
(58) Field of Search ................................. 348/370, 371, 348/223.1, 224.1, 225.1, 655; 382/167

(56) References Cited

U.S. PATENT DOCUMENTS

| | | | |
|---|---|---|---|
| 5,956,015 A | * | 9/1999 | Hino ........................... 345/153 |
| 6,075,563 A | * | 6/2000 | Hung ....................... 348/223.1 |
| 6,081,254 A | * | 6/2000 | Tanaka et al. ............... 345/154 |
| 6,466,334 B1 | * | 10/2002 | Komiya et al. .............. 358/1.9 |
| 6,639,628 B1 | * | 10/2002 | Lee et al. ................. 348/223.1 |
| 6,549,653 B1 | * | 4/2003 | Osawa et al. ............... 382/162 |

OTHER PUBLICATIONS

"Color Appearance Models", Mark D. Fairchild, Addison Wesley (1998), entire document.

* cited by examiner

Primary Examiner—Wendy R. Garber
Assistant Examiner—Jacqueline Wilson
(74) Attorney, Agent, or Firm—Frishauf, Holtz, Goodman & Chick, P.C.

(57) ABSTRACT

This invention includes an RGB color camera for photographing an object under photographing illumination light, a simplified spectrophotometer for measuring a photographing illumination light spectrum, and a color correction device for calculating tristimulus value data of the object and converting the data into an input signal to a CRT monitor by using monitor profile data. On the observation side, a CRT monitor and illumination light colorimeter for measuring the tristimulus values of observation illumination light are arranged. A color correction device can perform color reproduction without being influenced by changes in the color perception characteristics of a person such as chromatic adaptation by reproducing a virtual illumination light spectrum having tristimulus values equal to those of the observation illumination light without measuring any observation illumination light spectrum.

9 Claims, 7 Drawing Sheets

COLOR REPRODUCING SYSTEM FOR REPRODUCING A COLOR OF AN OBJECT UNDER ILLUMINATION LIGHT

BACKGROUND OF THE INVENTION

The present invention relates to a color reproduction system capable of reproducing a color of an object in consideration of observation illumination light when the image recorded on a recording medium is to be reproduced.

Recently, a color management system (CMS) such as a color reproduction system has been widely used, in which the image data obtained by photographing a desired object using a color image input device such as a digital camera is corrected, and a color of the object is faithfully reproduced by a display device such as a CRT monitor or an output device such as a color printer.

In such a system, if illumination light on the photographing side on which an object is photographed differs from illumination light on the observation side on which a reproduced image is observed, the color based on the tristimulus values X, Y, and Z of the object on the photographing side and observed under the illumination light on the observation side looks different from that under the illumination light on the photographing side owing to changes in the perception characteristics of a person, e.g., color adaptation. That is, a problem is posed in terms of "appearance".

The tristimulus values X, Y, and Z are the quantitative values of a color which are determined by if the International Commission on Illumination (Commission Internationale de l'Eclariage; CIE) and guarantee the "appearance" of the same color under the same illumination light. However, such values cannot properly cope with the "appearance" of a color under different kinds of illumination light as described above.

In order to solve this problem, a conventional CMS aims at reproducing corresponding colors as tristimulus values that provide the "appearance" of the same color on both the observation side and the photographing side by using a human chromatic perception model such as a color adaptation model.

Several models as human color perception models including chromatic adaptation models are disclosed in Mark. D. Fairchild, Color Appearance Models, Addison Wesley, (1998). Studies have been made to construct models that allow more accurate color prediction.

The conventional CMS reproduces the "appearance" of a color of an object on the photographing side. In contrast to this, the color reproduction system disclosed in Jpn. Pat. Appln. KOKAI Publication No. 9-172649 estimates a spectral reflectance image of an object from a photographing image, and applying an observation illumination light spectrum to the spectral reflectance image to obtain tristimulus values under the observation illumination light and reproduce the color, thereby reproducing the "appearance" of the color on the observation side.

In a method of performing such illumination conversion, since tristimulus values of a color of an object under actual observation illumination light are reproduced, the "appearance" of the color can be accurately reproduced without any consideration given to the human perception characteristics such as chromatic adaptation.

Unlike in the conventional CMS, in the above color reproduction method of performing illumination conversion, there is no need to establish a linear conversion relationship between the spectral sensitivity of a camera and CIEXYZ color matching functions, and a color adaptation model under study need not be used. This method, however, requires various data, e.g., illumination light spectrum data on the photographing side and observation side, the spectral sensitivity data of a camera, and statistical characteristics of the spectral reflectance of an object.

In order to measure illumination light spectrum data of such data, an expensive spectrophotometer is generally required, and measurements under the actual photographing environment and observation environment are required. This makes it difficult to construct a simple system.

In addition, the spectrum characteristics of observation illumination light are not always suited to reproduce a color of an object, a problem arises when delicate differences between colors are to be evaluated.

When there are a plurality of portions to be observed, these portions are rarely positioned under the same illumination light. In general, the respective observers use different kinds of illumination light, and observe the color under the different kinds of illumination light. An inconvenience is caused in many cases, e.g., when an observer is to make a decision for diagnosis in a remote medical practice on the basis of colors while observing a color image of a patient and when absolute evaluation is required without any dependence on communication and observation environments.

BRIEF SUMMARY OF THE INVENTION

It is an object of the present invention to provide a color reproduction system which can replace measurement of an observation illumination light spectrum with simpler measurement of tristimulus values, and performs illumination conversion that allows color reproduction of an object under an illumination light spectrum suited to color reproduction.

According to the present invention, there is provided a color reproduction system comprising color image input means, color estimation means for calculating tristimulus values by correcting a color image signal obtained from the color image input means, and color image output means for outputting a color based on the tristimulus values obtained by the color estimation means, the color estimation means including illumination light measuring means for measuring tristimulus values of observation illumination light, virtual illumination light spectrum calculation means for calculating a virtual illumination light spectrum that provides tristimulus values equal to the tristimulus values of the observation illumination light which are obtained by the illumination light measuring means, and tristimulus value calculation means for calculating tristimulus values of the object under the virtual illumination light spectrum from the color image signal.

The virtual illumination light spectrum calculation means calculates a spectrum from a linear combination of predetermined illumination light spectrum basis functions. The virtual illumination light spectrum calculation means calculates a spectrum satisfying the relation that linear conversion of a product of a spectral sensitivity of the color image input means aud a photographing illumination light spectrum is a product of a color matching function and the virtual illumination light spectrum.

In addition, there is provided a color reproduction system comprising color image input means, color estimation means for calculating tristimulus values by correcting a color image signal obtained by the color image input means, and color image output means for outputting a color based on the tristimulus values obtained by the color estimation means, the color estimation means including illumination light measuring means for measuring tristimulus values of observation illumination light, tristimulus value calculating means for calculating tristimulus values of the object under a predetermined standard illumination light spectrum from the color image signal, and corresponding color calculation means for calculating tristimulus values that provide "appearance" of the color of the object which is based on the tristimulus values under the standard illumination light spectrum.

The color reproduction system having the above arrangement accurately reproduces the "appearance" of a color without being influenced by changes in the color perception characteristics of a person such as chromatic adaptation by reproducing the tristimulus values of an object under a virtual illumination light spectrum which provide tristimulus values equal to those of observation illumination light without measuring any observation illumination light spectrum.

In addition, color reproduction can be performed under illumination light superior in color rendering characteristics to an actual observation illumination light spectrum by calculating a spectrum from the linear combination of basis functions. If such basis functions are standardized, a spectrum is uniquely determined by the tristimulus values of observation illumination light. This facilitates standardization of the characteristics of observation illumination light on the spectrum level. Furthermore, if a virtual illumination light spectrum is obtained such that a linear conversion relationship is established between the product of the spectral sensitivity of the color image input means and a photographing illumination light spectrum and the product of a color matching function and the virtual illumination light spectrum, the accurate tristimulus values of an arbitrary object can be obtained under virtual illumination light.

Each color of an object can always be observed under a predetermined standard illumination light spectrum without any dependence on photographing illumination light and observation illumination light by calculating the tristimulus values of the object under the predetermined standard illumination light spectrum and reproducing tristimulus values that provide the "appearance" of the color, based on the tristimulus values of the object under the standard illumination light spectrum, under the observation illumination light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
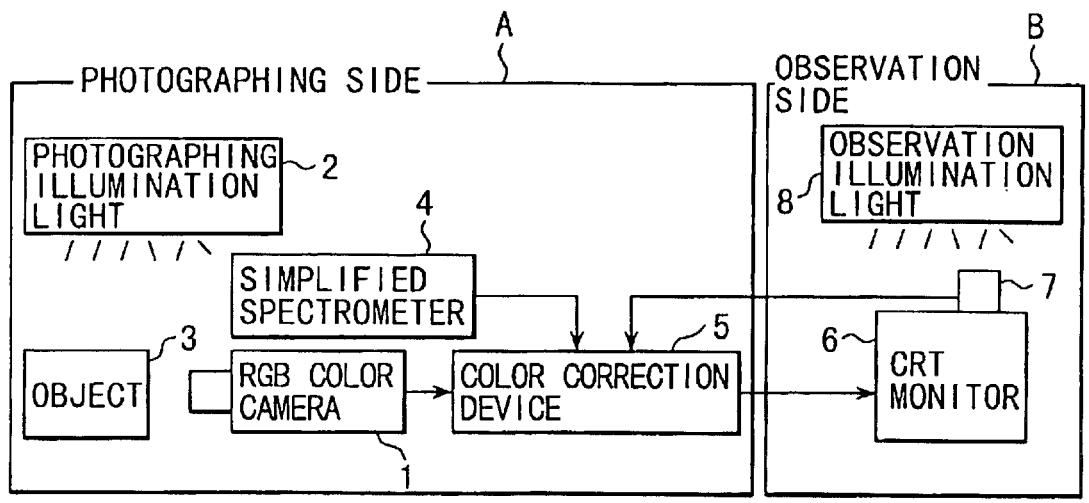
FIG. 1 is a block diagram showing an example of the arrangement of an image processing apparatus according to the first embodiment.

Embodiments of the present invention will be described in detail below with reference to the views of the accompanying drawing.

An outline of a color reproduction system according to the present invention will be described first.

In general, to reproduce a color of an object under observation illumination light from a spectral reflectance $f(\lambda)$ of the object, tristimulus values $X_o$, $Y_o$, and $Z_o$ must be reproduced, which are calculated from observation illumination light spectrum $E_o(\lambda)$ and CIE color matching functions $x(\lambda)$, $y(\lambda)$, and $z(\lambda)$ according to the following equations:

$$X_o = \int_{380}^{780} x(\lambda) E_o(\lambda) f(\lambda) d\lambda \qquad (1)$$

$$Y_o = \int_{380}^{780} y(\lambda) E_o(\lambda) f(\lambda) d\lambda$$

$$Z_o = \int_{380}^{780} z(\lambda) E_o(\lambda) f(\lambda) d\lambda$$

In this case, since tristimulus values X, Y, and Z in a case wherein the object is located under observation illumination light are reproduced, color reproduction can be accurately performed without any consideration of the visual characteristics of a person which change in accordance with the characteristics of observation illumination light.

In contrast to this, the color based on the tristimulus value X, Y, and Z calculated under illumination light different from the actual observation illumination light is generally perceived as a color with an "appearance" different from the actual "appearance" under the observation illumination light because the visual characteristics, e.g., chromatic adaptation, of a person changes.

With regard to the color perception of a person, the colors based on the same tristimulus values X, Y, and Z are perceived as the same color even if the colors have different spectra. For this reason, under illumination light with the same tristimulus values, the visual characteristics remain unchanged even with different spectra.

That is, even if the tristimulus values X, Y, and Z of an object under virtual illumination light having the same tristimulus values X, Y, and Z as those of actual observation illumination light and a spectrum different from that thereof are reproduced, the "appearance" of the color under the illumination light can be accurately reproduced.

On the basis of such an idea, the tristimulus values X, Y, and Z of observation illumination light are measured, and a virtual illumination light spectrum that provides the same tristimulus values X, Y, and Z are calculated to reproduce the tristimulus values X, Y, and Z of the object under the virtual illumination light. This makes it possible to perform accurate color reproduction without measuring the spectrum of the observation illumination light.

A virtual illumination light spectrum that provides the same tristimulus values X, Y, and Z as those of observation illumination light can be calculated with a certain degree of freedom, but can be uniquely determined by using three predetermined independent basis functions.

If the predetermined basis functions are represented by $p_i(\lambda)$ (i=1, 2, 3), and the measured tristimulus values of observation illumination light are represented by $X_{wo}$, $Y_{wo}$, and $Z_{wo}$, a virtual illumination light spectrum $E_h(\lambda)$ can be given by $$E_h(\lambda) = \sum_{i=1}^{3} c_i p_i(\lambda) \tag{2}$$

where $$\begin{pmatrix} c_1 \\ c_2 \\ c_3 \end{pmatrix} = \begin{pmatrix} \int_{380}^{780} x(\lambda)\rho_1(\lambda)d\lambda & \int_{380}^{780} x(\lambda)\rho_2(\lambda)d\lambda & \int_{380}^{780} x(\lambda)\rho_3(\lambda)d\lambda \\ \int_{380}^{780} y(\lambda)\rho_1(\lambda)d\lambda & \int_{380}^{780} y(\lambda)\rho_2(\lambda)d\lambda & \int_{380}^{780} y(\lambda)\rho_3(\lambda)d\lambda \\ \int_{380}^{780} z(\lambda)\rho_1(\lambda)d\lambda & \int_{380}^{780} z(\lambda)\rho_2(\lambda)d\lambda & \int_{380}^{780} z(\lambda)\rho_3(\lambda)d\lambda \end{pmatrix}^{-1} \begin{pmatrix} X_{wo} \\ Y_{wo} \\ Z_{wo} \end{pmatrix} \tag{3}$$

As the basis functions, for example, the daylight basis functions disclosed in Publication CIE No. 15.2 (1986) can be used. A daylight spectrum is given as the linear sum of three basis functions, can be defined by determining weighting coefficients for the respective basis functions.

Figure 2:
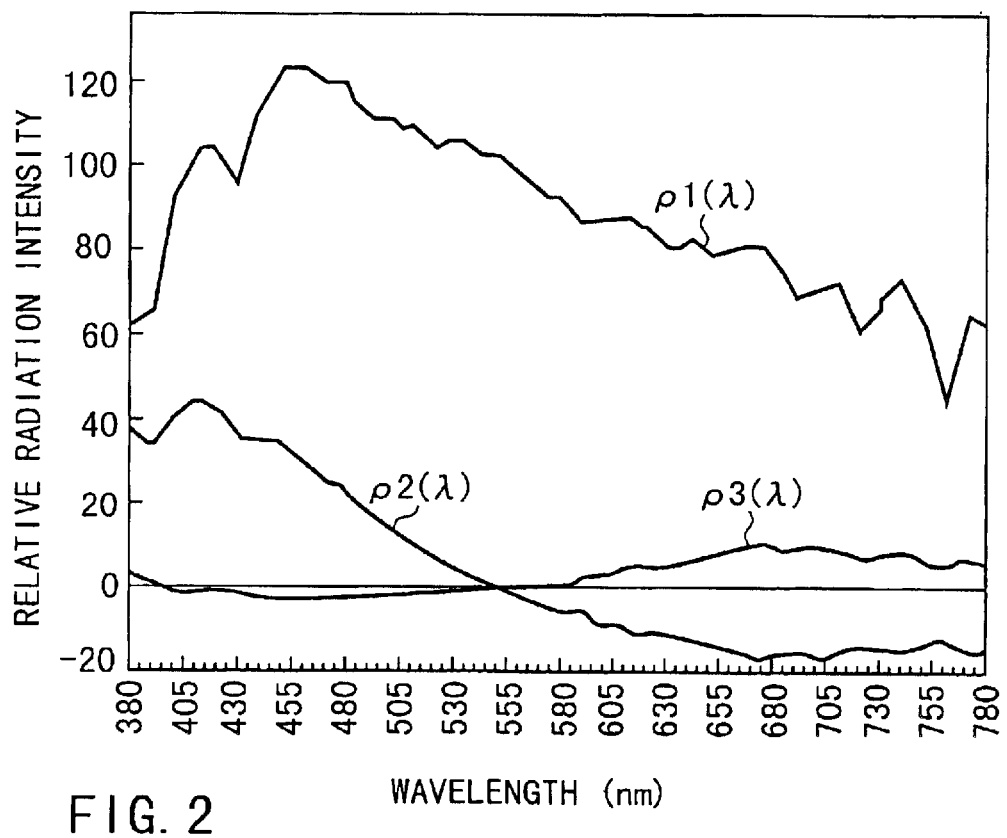
FIG. 2 is a graph showing three basis functions for daylight spectra having wavelengths of 380 nm to 780 nm.

FIG. 2 shows the three basis functions of daylight having a wavelength of 380 nm to 780 nm.

In this case, when the tristimulus values X, Y, and Z are determined, these three weighting coefficients can be determined. Therefore, a daylight spectrum corresponding to the tristimulus values X, Y, and Z can be obtained. Tristimulus values $X_h$, $Y_h$, and $Z_h$ of the object under the virtual illumination light spectrum $Eh(\lambda)$ is given by $$X_h = \int_{380}^{780} x(\lambda) E_h(\lambda) f(\lambda) d\lambda \tag{4}$$

$$Y_h = \int_{380}^{780} y(\lambda) E_h(\lambda) f(\lambda) d\lambda$$

$$Z_h = \int_{380}^{780} z(\lambda) E_h(\lambda) f(\lambda) d\lambda$$

Although these tristimulus values differ from the tristimulus values $X_o$, $Y_o$, and $Z_o$ of the object under the actual observation illumination light, the "appearance" of the object is not influenced by changes in the visual characteristics of the person due to the difference in illumination light.

In this manner, color reproduction free from the influences of changes in the visual characteristics of the person can be performed by reproducing the tristimulus values X, Y, and Z of the object under the virtual illumination light spectrum that provides the same tristimulus values X, Y, and Z as those of the actual observation illumination light without measuring any illumination light spectrum.

As described above, by using daylight basis functions and the like, color reproduction can be implemented under an illumination light spectrum having excellent characteristics for color evaluation regardless of the characteristics of an illumination light spectrum on the actual observation side.

In addition, by standardizing basis functions for a virtual illumination light spectrum, color reproduction under illumination light having the same tristimulus values X, Y, and Z always reproduces a color under illumination light having the same spectrum. This makes it possible to unify observation illumination conditions for reproduced colors in different observation environments.

Photographing signals R, G, and B of an object with the spectral reflectance $f(\lambda)$ which is photographed under a photographing illumination light spectrum $Em(\lambda)$ by an RGB camera with spectral sensitivities $r(\lambda)$, $g(\lambda)$, and $b(\lambda)$, and tristimulus values $X_{fo}$, $Y_{fo}$, and $Z_{fo}$ of the object under the observation illumination light spectrum $Eo(\lambda)$ can be given by $$R = \int_{380}^{780} r(\lambda) E_m(\lambda) f(\lambda) d\lambda \tag{5}$$

$$G = \int_{380}^{780} g(\lambda) E_m(\lambda) f(\lambda) d\lambda$$

$$B = \int_{380}^{780} b(\lambda) E_m(\lambda) f(\lambda) d\lambda$$

$$X_{fo} = \int_{380}^{780} x(\lambda) E_o(\lambda) f(\lambda) d\lambda \tag{6}$$

$$Y_{fo} = \int_{380}^{780} y(\lambda) E_o(\lambda) f(\lambda) d\lambda$$

$$Z_{fo} = \int_{380}^{780} z(\lambda) E_o(\lambda) f(\lambda) d\lambda$$

In order to obtain the tristimulus values $X_{fo}$, $Y_{fo}$, and $Z_{fo}$ of an arbitrary object from the signals R, G, and B, the tristimulus values must be expressed as follows with respect to an arbitrary spectral reflectance f(s):

$$\begin{pmatrix} X_{fo} \\ Y_{fo} \\ Z_{fo} \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} R \\ G \\ B \end{pmatrix} \quad (7)$$

That is, the tristimulus values must satisfy $$\begin{pmatrix} x(\lambda)E_o(\lambda) \\ y(\lambda)E_o(\lambda) \\ z(\lambda)E_o(\lambda) \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} r(\lambda)E_m(\lambda) \\ g(\lambda)E_m(\lambda) \\ b(\lambda)E_m(\lambda) \end{pmatrix} \quad (8)$$

In practice, the system rarely satisfies such a condition. However, this condition can be satisfied by replacing the observation illumination light spectrum Eo(λ) with the virtual illumination light spectrum Eh(λ) that satisfies equation (8).

At this time, the tristimulus values $X_{fo}$, $Y_{fo}$, and $Z_{fo}$ of an arbitrary object under the virtual illumination light can be accurately obtained from the signals R, G, and B.

When a color under virtual illumination light different from actual observation illumination light is to be reproduced, the "appearance" of the reproduced color can be kept unchanged under the condition that the tristimulus values $X_o$, $Y_o$, and $Z_o$ of the observation illumination light coincide with the tristimulus values $X_h$, $Y_h$, and $Z_h$ of the virtual illumination light.

To obtain the virtual illumination light spectrum $E_h(\lambda)$ that satisfies this condition, a spectrum that minimizes an error function $E_{XYZ}$ and value $E_{Luther}$ given by the following equation is obtained by repetitive calculation.

$$E_{XYZ} = [X_o - X_h]^2 + [Y_o - Y_h]^2 + [Z_o - Z_h]^2 \quad (9)$$

$$E_{Luther} = \int_{380}^{780} [x(\lambda)E_h(\lambda) - \{m_{11}r(\lambda) + m_{12}g(\lambda) + m_{13}b(\lambda)\}E_m(\lambda)]^2 d\lambda + \quad (10)$$
$$\int_{380}^{780} [y(\lambda)E_h(\lambda) - \{m_{21}r(\lambda) + m_{22}g(\lambda) + m_{23}b(\lambda)\}E_m(\lambda)]^2 d\lambda +$$
$$\int_{380}^{780} [z(\lambda)E_h(\lambda) - \{m_{31}r(\lambda) + m_{32}g(\lambda) + m_{33}b(\lambda)\}E_m(\lambda)]^2 d\lambda$$

$$\frac{\partial E_{Luther}}{\partial m_{11}} = \frac{\partial E_{Luther}}{\partial m_{12}} = \frac{\partial E_{Luther}}{\partial m_{13}} = \frac{\partial E_{Luther}}{\partial m_{21}} = \ldots = \frac{\partial E_{Luther}}{\partial m_{33}} = 0 \quad (11)$$

If both the function $E_{XYZ}$ and the value $E_{Luther}$ are "0", the tristimulus values of an object having an arbitrary spectral reflectance under virtual illumination light are obtained from camera photographing signals. In this case, the same "appearance" as that under the virtual illumination light can be observed under the actual observation illumination light.

Consider a case wherein virtual illumination light is provided as only one predetermined spectrum.

In this case, if the virtual illumination light is standard illumination light, tristimulus values $X_s$, $Y_s$, and $Z_s$ of the object under a standard illumination light spectrum $E_s(\lambda)$ is given by $$X_S = \int_{380}^{780} x(\lambda)E_S(\lambda)f(\lambda)d\lambda \quad (12)$$

$$Y_S = \int_{380}^{780} y(\lambda)E_S(\lambda)f(\lambda)d\lambda$$

$$Z_S = \int_{380}^{780} z(\lambda)E_S(\lambda)f(\lambda)d\lambda$$

The "appearance" of the color based on the tristimulus values $X_s$, $Y_s$, and $Z_s$ under the standard illumination light differs from the "appearance" of the color under observation illumination light having the tristimulus values X, Y, and Z which differ from those of the standard illumination light.

The tristimulus values X, Y, and Z of an object whose "appearance" remains unchanged under illumination light having different tristimulus values X, Y, and Z are termed as corresponding colors. The "appearance" of the color of the object under the standard illumination light can be reproduced under the observation illumination light by obtaining and reproducing the corresponding colors of the object having the tristimulus values $X_s$, $Y_s$, and $Z_s$ under the observation illumination light.

As a method of obtaining corresponding colors, a method of using the human color perception model obtained by modeling a chromatic adaptation mechanism is used.

As such chromatic adaptation models, several models such as the Von Kries model that is the basis of other models are proposed. Corresponding colors $X_c$, $Y_c$, and $Z_c$ based on the Von Kries model and corresponding to the tristimulus values $X_s$, $Y_s$, and $Z_s$ of an object under the standard illumination light are given by the following equation, provided that the tristimulus values of the standard illumination light are represented by $X_{ws}$, $Y_{ws}$, and $Z_{ws}$, and the tristimulus values of the observation illumination light are represented by $X_{wo}$, $Y_{wo}$, and $Z_{wo}$.

$$\begin{pmatrix} X_C \\ Y_C \\ Z_C \end{pmatrix} = M^{-1} \begin{pmatrix} \frac{1}{X_{WO}} & 0 & 0 \\ 0 & \frac{1}{Y_{WO}} & 0 \\ 0 & 0 & \frac{1}{Z_{WO}} \end{pmatrix}^{-1} \begin{pmatrix} \frac{1}{X_{WS}} & 0 & 0 \\ 0 & \frac{1}{Y_{WS}} & 0 \\ 0 & 0 & \frac{1}{Z_{WS}} \end{pmatrix} M \begin{pmatrix} X_S \\ Y_S \\ Z_S \end{pmatrix} \quad (13)$$

Note that M represents a 3×3 matrix for converting the tristimulus values X, Y, and Z into the stimulus amount of a cone. In addition to such a chromatic adaptation model based on only the consideration of chromatic adaptation, many color "appearance" models for predicting perception amounts have been provided. These models can be used in accordance with different observation environments.

In this manner, the tristimulus values of the object under the standard illumination light are obtained, and the "appearance" of the color based on the tristimulus values under the standard illumination light is reproduced under observation illumination light. With this operation, the "appearance" of a color of an object under the same illumination light spectrum can be reproduced under different observation illumination light environments.

This makes it possible to standardize observation illumination light environments for an object independently of illumination light on the photographing side and observation side. If a spectrum having excellent color rendering characteristics is defined as a standard illumination light spectrum used in this case, color reproduction can be performed with an illumination light spectrum having excellent characteristics independently of illumination light on the photographing side and observation side. In this case as well, the spectrum of observation illumination light need not be measured, and the tristimulus values X, Y, and Z can be measured instead.

Figure 3:
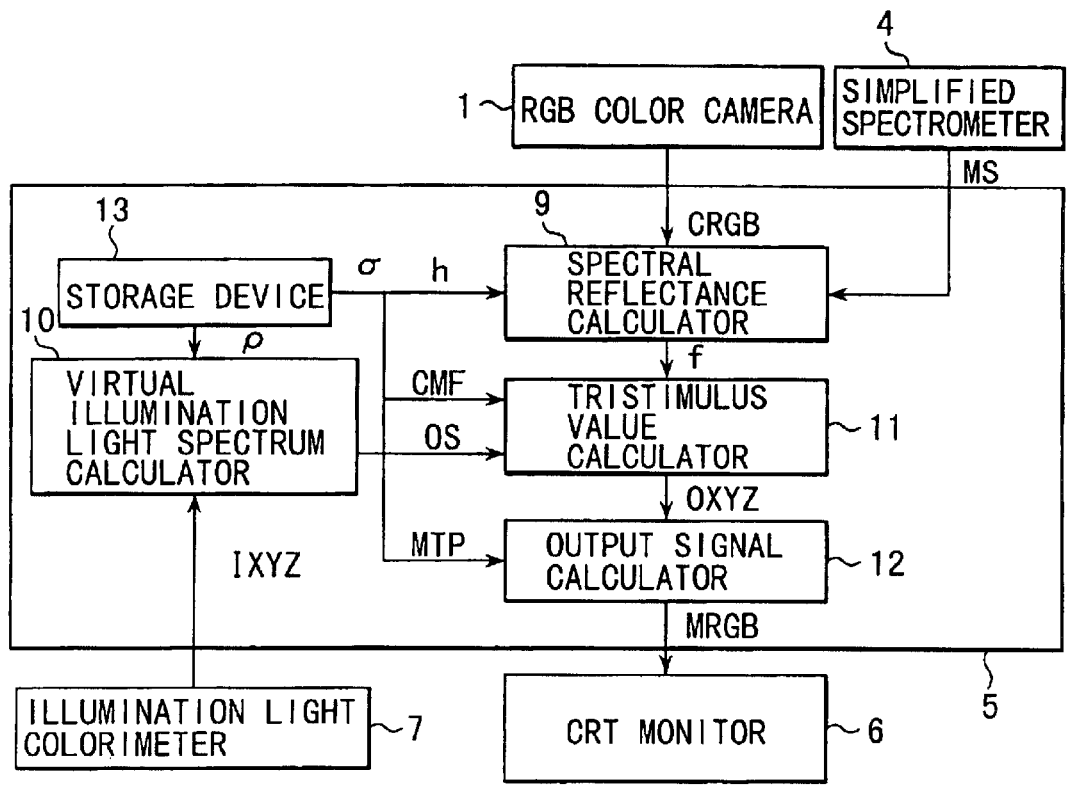
FIG. 3 is a block diagram showing the detailed arrangement of a color correction device in FIG. 1.

FIG. 1 shows the arrangement of an image processing apparatus according to the first embodiment of the present invention. FIG. 3 shows the detailed arrangement of a color correction device 5 in FIG. 1 and the flows of data ("[ ]" indicates the reference symbol of each data in FIG. 3).

The image processing apparatus of this embodiment is designed as a virtual illumination color reproduction system constituted by a photographing side A and observation side B connected to each other through an arbitrary line capable of transferring data such as image data.

The photographing side A includes an RGB color camera 1 for photographing an object 3 under photographing illumination light 2, simplified spectrometer 4 for measuring a photographing illumination light spectrum, and the color correction device 5 for calculating the tristimulus data of the object 3 and converting it into an input signal to a CRT monitor 6 by using monitor profile data. The observation side B includes the CRT monitor 6 and a illumination light calorimeter 7 for measuring the tristimulus values of observation illumination light 8.

On the photographing side A, the RGB color camera 1 photographs the object 3 under the photographing illumination light 2 to obtain an RGB image. The simplified spectrometer 4 then measures photographing illumination light spectrum data [MS]. For example, this simplified spectrometer 4 is designed to measure the radiation intensity of an illumination light spectrum in the wavelength range of 380 nm to 780 nm in 1-nm intervals. Obtained RGB image data [CRGB] and photographing illumination light spectrum data are sent to the color correction device 5.

On the observation side B, the illumination light colorimeter 7 mounted on the CRT monitor 6 measures tristimulus values [IXYZ] of the observation illumination light 8.

The illumination light calorimeter 7 is made up of three sensors respectively having spectral sensitivities approximated to tristimulus value XYZ color matching functions by three filters (not shown), and measures the tristimulus values X, Y, and Z of the observation illumination light 8 near the CRT monitor 6.

The tristimulus values X, Y, and Z of the observation illumination light 8 are sent to the color correction device 5 on the photographing side. The color correction device 5 calculates spectral reflectance data [f] of the object 3 from spectral sensitivity data [h] of the RGB color camera 1 and object characteristic data [σ] which are stored in advance.

Virtual illumination light spectrum data [OS] is calculated from the tristimulus value data of the observation illumination light 8 measured by the illumination light colorimeter 7 and a basis function [ρ] stored in advance. Tristimulus value data [OXYZ] of the object 3 is calculated from the spectral reflectance data of the object 3, color matching function data [CMF] stored in advance, and the calculated virtual illumination light spectrum data.

The obtained tristimulus value data of the object 3 is converted into an input signal [MRGB] to the CRT monitor 6 by using monitor profile data [MTP]. This input signal is then sent to the CRT monitor 6. The observer observes the color image of the object 3 displayed on the CRT monitor 6 under the observation illumination light 8.

The detailed arrangement of the color correction device 5 will be described next with reference to FIG. 3.

The color correction device 5 is made up of a spectral reflectance calculator 9 for calculating the spectral reflectance data of an object from RGB image data, virtual illumination light spectrum calculator 10 for calculating a virtual illumination light spectrum from the tristimulus value data of the observation illumination light 8, tristimulus value calculator 11 for calculating the tristimulus values of the object 3 from the spectral reflectance data of the object 3, output signal calculator 12 for converting the tristimulus values of the object 3 into an input signal to the CRT monitor 6, and storage device 13.

In this arrangement, the spectral reflectance calculator 9 calculates a spectral reflectance $f(\lambda)$ of the object 3 from the RGB image data input from the RGB color camera 1 by using photographing illumination light spectrum data $S_M(\lambda)$ measured by the simplified spectrometer 4, the object characteristic data stored in the storage device 13, and the spectral sensitivity data of the RGB color camera 1.

The photographing illumination light spectrum data $S_M(\lambda)$ has radiation intensity data at 1-nm intervals in the wavelength range of 380 nm to 780 nm.

The object characteristic data is comprised of three basis function data $\sigma_1(\lambda)$, $\sigma_2(\lambda)$, and $\sigma_3(\lambda)$ of the spectral reflectance of the object 3. Each basis function has values at 1-nm intervals in the wavelength range from 380 nm to 780 nm. Each basis function which is and an eigenvector of the correlation matrix of spectral reflections is formed in accordance with the type of object.

The spectral reflectance of an object can be expressed by the linear combination of basis functions. The spectral sensitivity data of the RGB camera has sensitivity value data at 1-nm intervals in the wavelength range from 380 nm to 780 nm of $h_r(\lambda)$, $h_g(\lambda)$ and $h_b(\lambda)$ for each of R, G, and B channels.

The spectral reflectance calculator 9 calculates the spectral reflectance $f(\lambda)$ according to the following equations:

$$f(\lambda) = \sigma \cdot (D^{-1}C) \quad (14)$$

where:

$$\sigma = (\sigma_1(\lambda), \sigma_2(\lambda), \sigma_3(\lambda))$$

$$\sigma = (R, G, B)^t$$

$$D = \begin{pmatrix} \int_{380}^{780} h_r(\lambda)\sigma_1(\lambda)S_m(\lambda)d\lambda & \int_{380}^{780} h_r(\lambda)\sigma_2(\lambda)S_m(\lambda)d\lambda & \int_{380}^{780} h_r(\lambda)\sigma_3(\lambda)S_m(\lambda)d\lambda \\ \int_{380}^{780} h_g(\lambda)\sigma_1(\lambda)S_m(\lambda)d\lambda & \int_{380}^{780} h_g(\lambda)\sigma_2(\lambda)S_m(\lambda)d\lambda & \int_{380}^{780} h_g(\lambda)\sigma_3(\lambda)S_m(\lambda)d\lambda \\ \int_{380}^{780} h_b(\lambda)\sigma_1(\lambda)S_m(\lambda)d\lambda & \int_{380}^{780} h_b(\lambda)\sigma_2(\lambda)S_m(\lambda)d\lambda & \int_{380}^{780} h_b(\lambda)\sigma_3(\lambda)S_m(\lambda)d\lambda \end{pmatrix} \quad (15)$$

where · represents an inner product, t represents transposition, and −1 represents an inverse matrix.

The virtual illumination light spectrum calculator receives tristimulus values $X_{wo}$, $Y_{wo}$, and $Z_{wo}$ of observation illumination light measured by the illumination light calorimeter 7 and predetermined basis functions $\rho_1(\lambda)$, $\rho_2(\lambda)$, and $\rho_3(\lambda)$ of a daylight spectrum from the storage device 13, and outputs a virtual illumination light spectrum $E_h(\lambda)$.

The virtual illumination light spectrum $E_h(\lambda)$ is the linear combination of the basis functions $\rho_1(\lambda)$, $\rho_2(\lambda)$, and $\rho_3(\lambda)$. The tristimulus values based on the virtual illumination light spectrum $E_h(\lambda)$ are the tristimulus values $X_{wo}$, $Y_{wo}$, and $Z_{wo}$ of the observation illumination light 8 and calculated according to equations (2) and (3).

The tristimulus value calculator 11 calculates the tristimulus values X, Y, and Z of the object 3 under the virtual illumination light spectrum from the spectral reflectance $f(\lambda)$ of the object 3 calculated by the spectral reflectance calculator 9, color matching function data $x(\lambda)$, $y(\lambda)$, and $z(\lambda)$ stored in the storage device 13 in advance, and the virtual illumination light spectrum $E_h(\lambda)$ calculated by the virtual illumination light spectrum calculator 10.

Tristimulus values $X_h$, $Y_h$, and $Z_h$ of the object under a virtual illumination light spectrum are calculated according to equations (4).

The output signal calculator 12 converts the tristimulus values $X_h$, $Y_h$, and $Z_h$ of the object 3 into input signals $R_m$, $G_m$, and $B_m$ for display on the CRT monitor 6 by using monitor profile data.

The monitor file data is made up of a 3×3 matrix and R, G, and B tone correction data. As this data, data obtained in advance by measurement is stored in the storage device 13. The tristimulus values $X_h$, $Y_h$, and $Z_h$ are converted into values $R_L$, $G_L$, and $B_L$ having a linear relationship with the values $X_h$, $Y_h$, and $Z_h$ by matrix conversion. The values $R_L$, $G_L$, and $B_L$ are converted into input signal values $R_m$, $G_m$, and $B_m$ by the inverse functions of $\gamma_r[R]$, $\gamma_g[G]$, and $\gamma_b[B]$ that define the relationship between output luminances and R, G, and B inputs to the CRT monitor. The input signals $R_m$, $G_m$, and $B_m$ are calculated from the tristimulus values $X_h$, $Y_h$, and $Z_h$ according to the following equation:

$$R_m = \gamma_r^{-1}[R_L]$$
$$G_m = \gamma_g^{-1}[G_L] \quad (16)$$
$$B_m = \gamma_b^{-1}[B_L]$$

$$\begin{pmatrix} R_L \\ G_L \\ B_L \end{pmatrix} = \begin{pmatrix} m_{xr} & m_{yr} & m_{zr} \\ m_{xg} & m_{yg} & m_{zg} \\ m_{xb} & m_{yb} & m_{zb} \end{pmatrix} \begin{pmatrix} X_h \\ Y_h \\ Z_h \end{pmatrix} \quad (17)$$

The input signals $R_m$, $G_m$, and $B_m$ calculated by the color correction device 5 are output to the CRT monitor 6. The CRT monitor 6 displays a color image having each pixel represented by the input signals $R_m$, $G_m$, and $B_m$. The observer observes the image under the observation illumination light 8. In order to allow the observer to adapt to the observation illumination light 8 during observation, the CRT monitor 6 does not display "white" unique to the CRT monitor 6.

Figure 4:
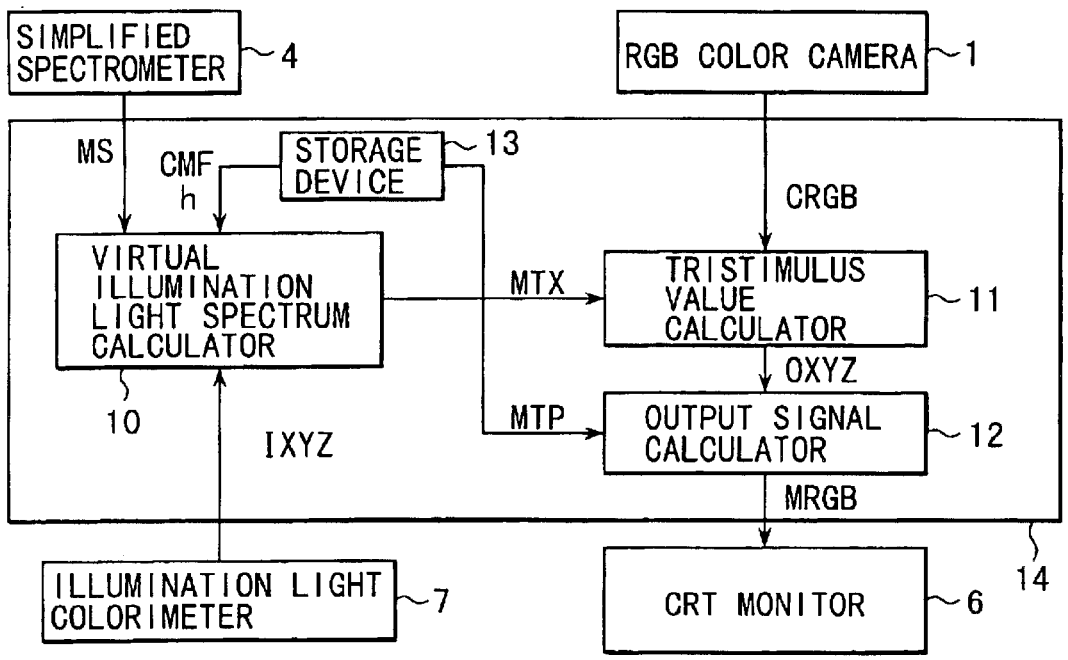
FIG. 4 is a block diagram showing the arrangement of a color correction device in an image processing apparatus according to the second embodiment.

FIG. 4 shows the arrangement of a color correction device for an image processing apparatus according to the second embodiment of the present invention. Since the arrangement of this embodiment is the same as that of the first embodiment described with reference to FIG. 1 except for the color correction device, the same reference numerals as in FIG. 1 denote the same parts in FIG. 4. This color correction device will be described in detail below. "[ ]" indicates the reference symbol of each data shown in FIG. 4.

A color correction device 14 of this embodiment is comprised of a virtual illumination light spectrum calculator 10 for forming a tristimulus value XYZ conversion matrix under virtual illumination light from the R, G, and B values of a camera photographing signal, tristimulus value calculator 11 for calculating the tristimulus values of an object under virtual illumination light, output signal calculator 12 for converting the tristimulus values of an object 3 into an input signal [MRGB] to a CRT monitor 6, and storage device 13.

Each component of the above color correction device will be described in detail below.

The virtual illumination light spectrum calculator 10 generates a virtual illumination light spectrum from photographing illumination light spectrum data [MS] measured by a simplified spectrometer 4, spectral sensitivity data [h] of an RGB color camera 1 which is stored in the storage device 13 in advance, color matching function data [CMF], and tristimulus values [IXYZ] of observation illumination light which are obtained by an illumination light colorimeter 7, and also forms a conversion matrix [MTX] for calculating tristimulus values $X_h$, $Y_h$, and $Z_h$ [OXYZ] of the object under virtual illumination light.

Note that the virtual illumination light spectrum is obtained such that the values given by equations (9) and (10) are minimized or become equal to or less than a threshold. Such a spectrum is obtained by adjusting the spectrum value of each wavelength and repeatedly calculating the evaluation values of equations (9) and (10). A matrix having values $m_{11}$ to $m_{33}$ calculated by equation (11) as elements in the virtual illumination light spectrum determined in this manner is output to the tristimulus value calculator 11.

The tristimulus value calculator 11 converts the RGB image data obtained by the RGB color camera 1 into tristimulus values X, Y, and Z using the conversion matrix obtained by the virtual illumination light spectrum calculator 10.

The output signal calculator 12 is equivalent to the output signal calculator 12 shown in FIG. 2, and a description thereof will be omitted.

Figure 5:
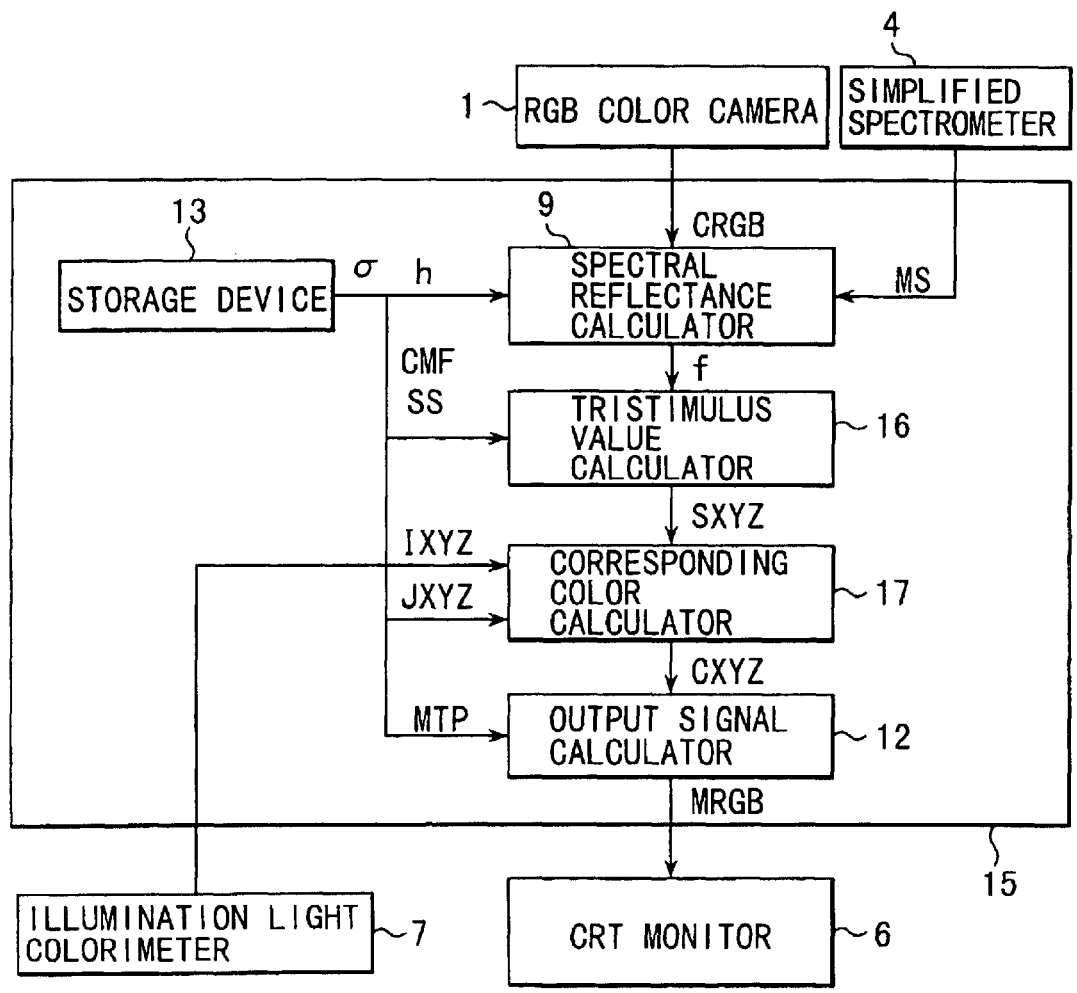
FIG. 5 is a block diagram showing the arrangement of a color correction device in an image processing apparatus according to the third embodiment.

FIG. 5 shows the arrangement of a color correction device for an image processing apparatus according to the third embodiment of the present invention. Since the arrangement of this embodiment is the same as that of the first embodiment described with reference to FIG. 2 except for the color correction device, the same reference numerals as in FIG. 2 denote the same parts in FIG. 5. This color correction device will be described in detail below. "[ ]" indicates the reference symbol of each data shown in FIG. 5.

A color correction device 15 is comprised of a spectral reflectance calculator 9 for calculating spectral reflectance data [f] of an object 3 (not shown) from RGB image data, tristimulus value calculator 16 for calculating tristimulus values [SXYZ] of the object 3 under standard illumination light from the spectral reflectance data of the object 3, corresponding color calculator 17 for calculating tristimulus values [CXYZ] of a corresponding color of the object under observation illumination light from the tristimulus values under the standard illumination light, output signal calculator 12 for converting the tristimulus values of the corresponding color into an input signal [MRGB] to a CRT monitor 6, and storage device 13.

The tristimulus value calculator 16 and corresponding color calculator 17 in the color correction device 15 which are different from those in FIG. 3 will be described below.

The tristimulus value calculator 16 calculates tristimulus values $X_s$, $Y_s$, and $Z_s$ [SXYZ] of the object 3 under standard illumination light on the basis of spectral reflectance data $f(\lambda)$ [f] of the object 3 calculated by the spectral reflectance calculator 9, together with color matching function data $x(\lambda)$, $y(\lambda)$, and $z(\lambda)$ [CMF] and standard illumination light spectrum data Es(λ) [SS] which are stored in advance. CIE D65 spectrum distribution data for the standard illumination light spectrum Es(λ) are given at 1-nm intervals in the wavelength range from 380 nm to 780 nm.

The CIE D65 spectrum distribution is defined by relative values. In this case, however, this data is defined by absolute value data suited to the observation environment for the standard CRT monitor 6.

The corresponding color calculator 17 converts the tristimulus values $X_s$, $Y_s$, and $Z_s$ of the object 3 under standard illumination light which are calculated by the tristimulus value calculator 16 into a corresponding color under observation illumination light.

Tristimulus values $X_{ws}$, $Y_{ws}$, and $Z_{ws}$ [JXYZ] of standard illumination light are input from the storage device 13, and tristimulus values $X_{wo}$, $Y_{wo}$, and $Z_{wo}$ [IXYZ] of observation illumination light are input from an illumination light calorimeter 7.

Tristimulus values $X_c$, $Y_c$, and $Z_c$ of the corresponding color are calculated according to equation (13). The data of a matrix M represented by equation (13) is stored in the corresponding color calculator 17, and the following value is stored.

$$M = \begin{pmatrix} 0.071 & 0.94 & -0.016 \\ -0.461 & 1.360 & 0.101 \\ 0.000 & 0.000 & 1.00 \end{pmatrix} \quad (18)$$

The tristimulus values $X_c$, $Y_c$, and $Z_c$ [CXYZ] of the corresponding color are converted into monitor input signals $R_m$, $G_m$, and $B_m$ [MRGB] by using a monitor profile. The color image having each pixel made of $R_m$, $G_m$, and $B_m$ is displayed on the CRT monitor 6. The observer then observes the color image displayed on the CRT monitor 6 under observation illumination light.

The observer can therefore observe the "appearance" of the color of the object, which is obtained under the standard illumination light, under the observation illumination light.

Figure 6:
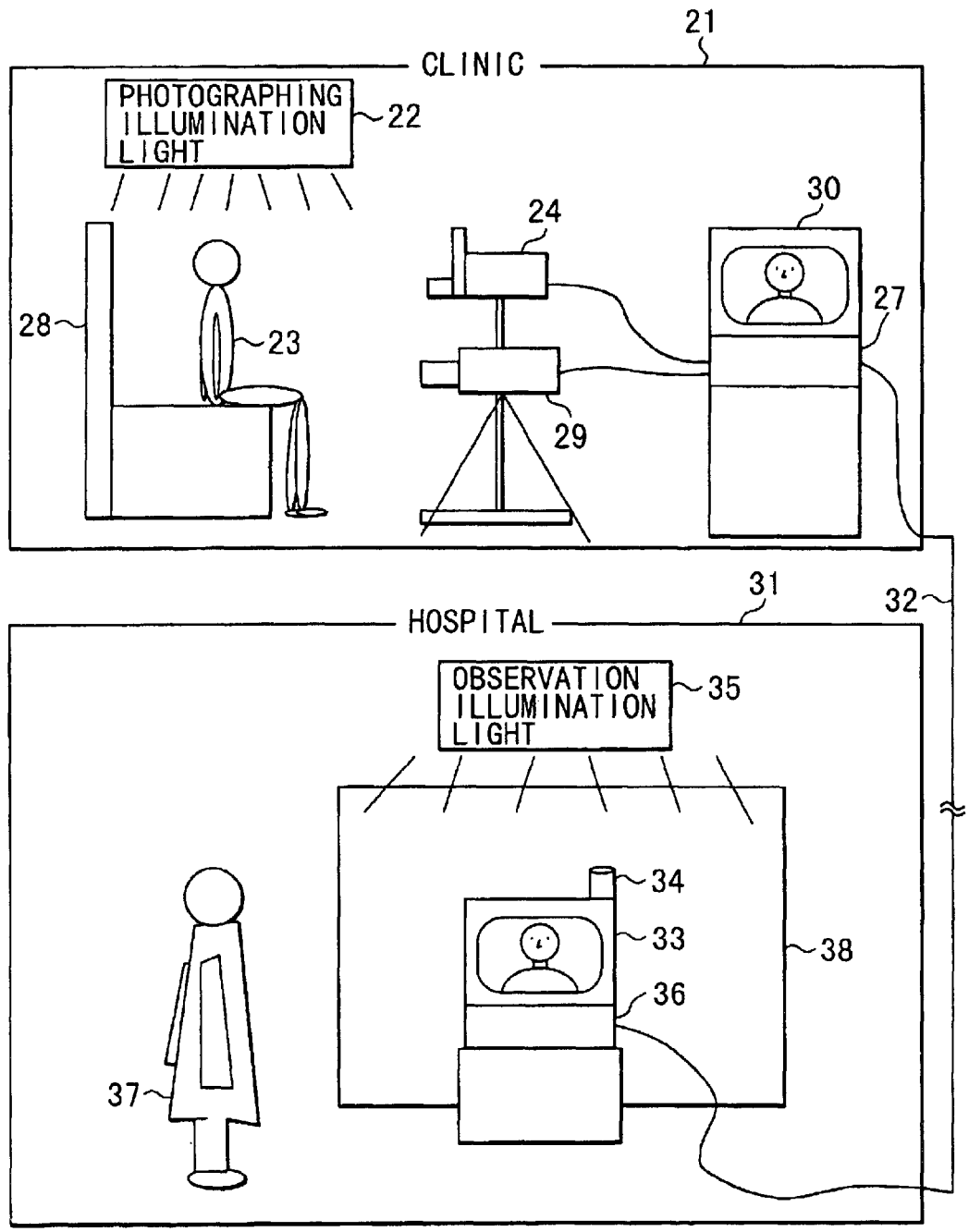
FIG. 6 is a view showing an example of how an image processing apparatus according to the fourth embodiment is used.

FIG. 6 shows an example of how an image processing according to the fourth embodiment of the present invention is used.

In this embodiment, for example, a patient 23 as an object is photographed by a multispectral camera (MSC) 24 in a clinic 21 to obtain a still image.

Figure 7:
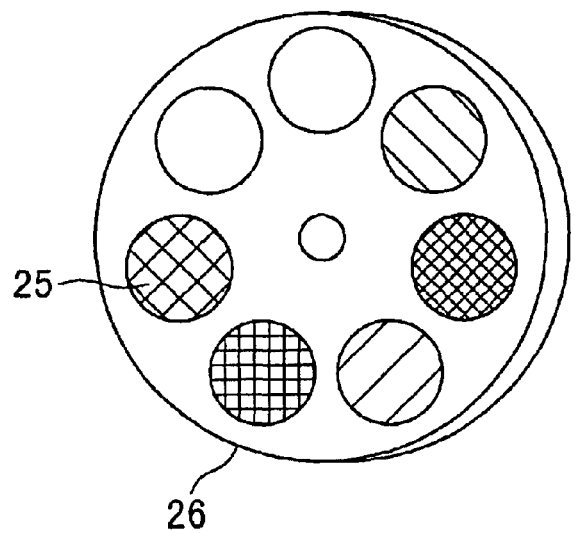
FIG. 7 is a view showing an example of the arrangement of a filter turret of a multispectral camera (MSC) used in the fourth embodiment.
Figure 8:
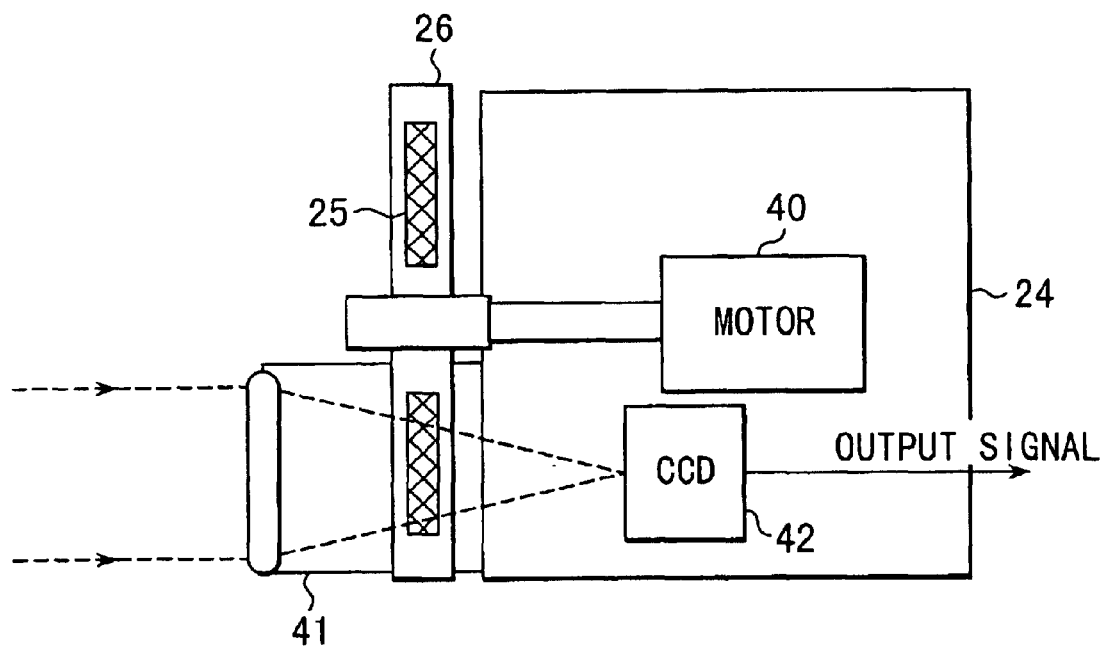
FIG. 8 is a view showing an example of the arrangement of the multispectral camera (MSC) used in the fourth embodiment.

The MSC 24 has a filter turret 26, as shown in FIG. 8. Seven interference filters 25 having different transmission wavelength bands are loaded in the filter turret 26, as shown in FIG. 7. The MSC 24 receives an optical image having passed through a photographing lens 41 as 7-channel image data by using a CCD 42 in synchronism with the filter turret 26 rotated by a motor 40.

The image data of the patient 23 photographed by the MSC 24 is loaded as 7-channel still image data into a computer 27. A white background plate 28 whose spectral reflectance can be regarded as a uniform value is placed behind the patient 23. A spectrophotometer 29 juxtaposed with the multispectral camera 24 measures the reflected light spectrum of photographing illumination light from the background plate 28.

The measurement data is loaded into the computer 27 and divided by the spectral reflectance of the background plate 28 which is stored in advance, thereby calculating a photographing illumination light spectrum. The clinic 21 is connected to a hospital 31 through a communication line 32. The tristimulus values X, Y, and Z of the observation illumination light 35 measured by an observation illumination light measuring device 34 placed near a CRT monitor 33 in the hospital 31 are sent to the clinic 21 through the communication line 32.

Assume that a virtual illumination light spectrum $E_h(\lambda)$ is generated by the same method as that in the first embodiment on the basis of tristimulus values X, Y, and Z of observation illumination light 35.

After the virtual illumination light spectrum is calculated, the XYZ image data of the object 23 is calculated on the basis of virtual illumination light spectrum data, photographing data, the spectral sensitivity data of the multispectral camera 24 which is stored in the computer 27 in advance, and object characteristic data. The XYZ image data is then sent to the computer 36 in the hospital 31 through the communication line 32. The tristimulus values X, Y, and Z are calculated according to equations (19) and (20).

$$\begin{pmatrix} X \\ Y \\ Z \end{pmatrix} = AB^{-1} \begin{pmatrix} g_1 \\ g_2 \\ g_3 \\ \vdots \\ g_7 \end{pmatrix} \quad (19)$$

Elements $a_{ij}$ and $b_{ij}$ of matrices A and B are given by $$a_{ij} = \int_{\lambda=380}^{780} \int_{\lambda'=380}^{780} E_h(\lambda) x_i(\lambda) \langle f(\lambda)f(\lambda')\rangle E_m(\lambda') h_j(\lambda') d\lambda d\lambda' \quad (20)$$

$$b_{ij} = \int_{\lambda=380}^{780} \int_{\lambda'=380}^{780} E_m(\lambda) h_i(\lambda) \langle f(\lambda)f(\lambda')\rangle E_m(\lambda') h_j(\lambda') d\lambda d\lambda'$$

In this case, "< >" indicates expected value calculation, and object characteristics <f(λ)f(λ')> represents the expected value of the spectral reflectance of the skin, which is important for diagnosis and stored in advance in a storage device as a database. The CRT monitor 33 in the hospital 31 converts the XYZ image data of the patient 23, which is sent from the clinic 21, into an RGB input signal to the CRT monitor 33 by using the profile data of the CRT monitor 33 which is stored in advance.

The RGB input signal image of the patient 23 is displayed on the CRT monitor 33. An observer 37 such as a doctor observes the color image on the CRT monitor 33 under the observation illumination light 35.

A white background plate 38 is placed behind the CRT monitor 33 in the hospital 31, and consideration is given to the observer 37 to allow him/her to adapt to reflected light of the observation illumination light 35 from the background plate 38.

If a spectral reflectance p(λ) of the background plate 38 is not a uniform value, tristimulus values $X_o$, $Y_o$, and $Z_o$ of the observation illumination light 35, which are used to calculate a virtual illumination light spectrum, are replaced with tristimulus values $X_b$, $Y_b$, and $Z_b$ of the background plate 38 which are given by $$X_b = \int_{380}^{780} x(\lambda) E_O(\lambda) p(\lambda) d\lambda \quad (21)$$

$$Y_b = \int_{380}^{780} y(\lambda) E_O(\lambda) p(\lambda) d\lambda$$

$$Z_b = \int_{380}^{780} z(\lambda) E_O(\lambda) p(\lambda) d\lambda$$

The observation illumination light measuring device 34 directly measures the tristimulus values of the observation illumination light 35 or reflected light of the observation illumination light 35 from the background plate 38 which are given by equations (21).

Assume that the observation illumination light measuring device 34 also serves as a measuring device for generating the monitor profile of the CRT monitor 33.

Figure 9:
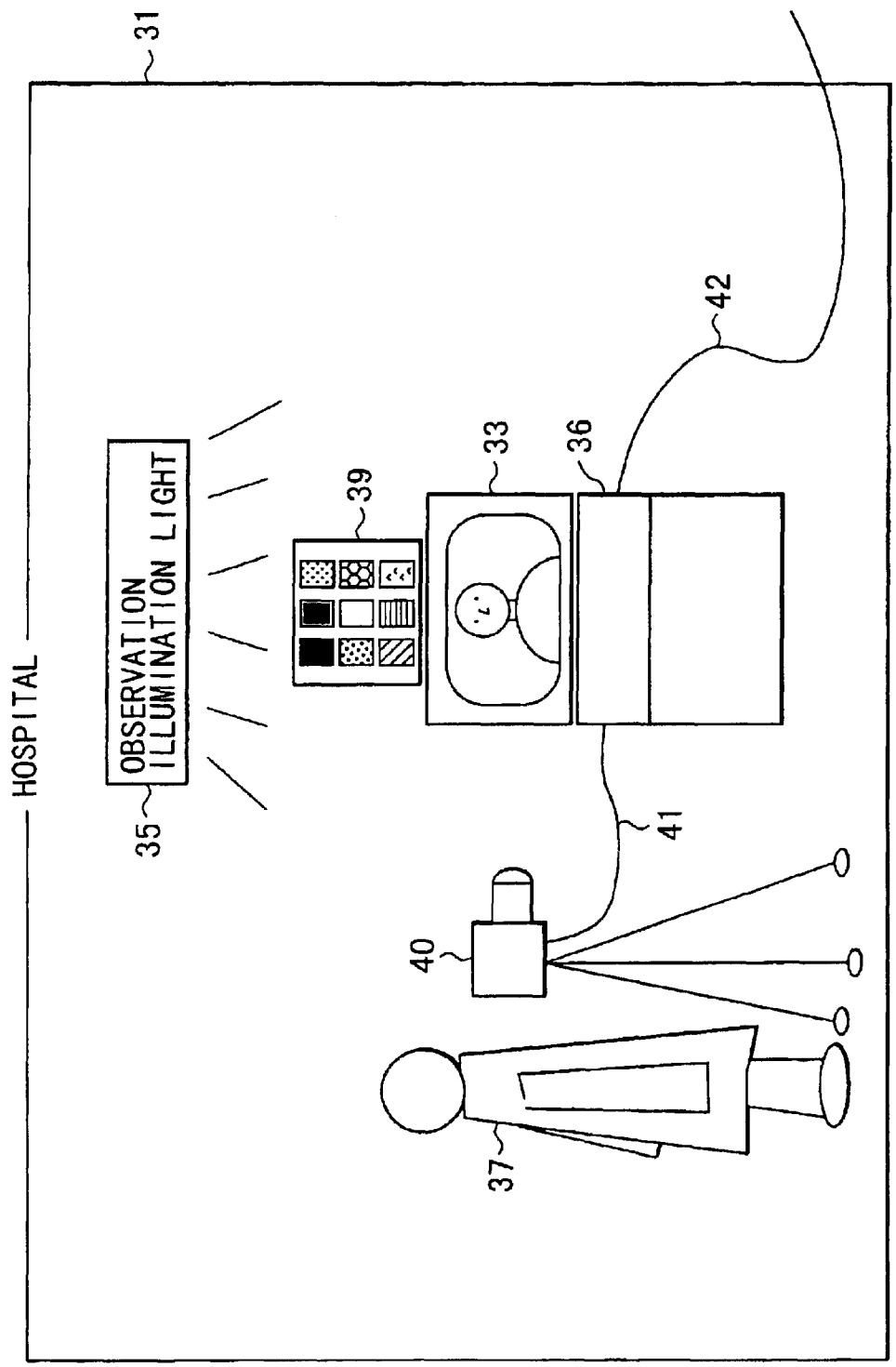
FIG. 9 is a view showing an example of how an image processing apparatus according to the fifth embodiment is used.

FIG. 9 shows an image processing apparatus according to the fifth embodiment of the present invention. This embodiment of the present invention has the following arrangement. In the fourth embodiment described above, the observation illumination light measuring device is used as a device for measuring the tristimulus values of observation illumination light.

To accurately measure the tristimulus values of observation illumination light, the spectral sensitivity of the observation illumination light measuring device must have a linear conversion relationship with a color matching function.

Figure 10:
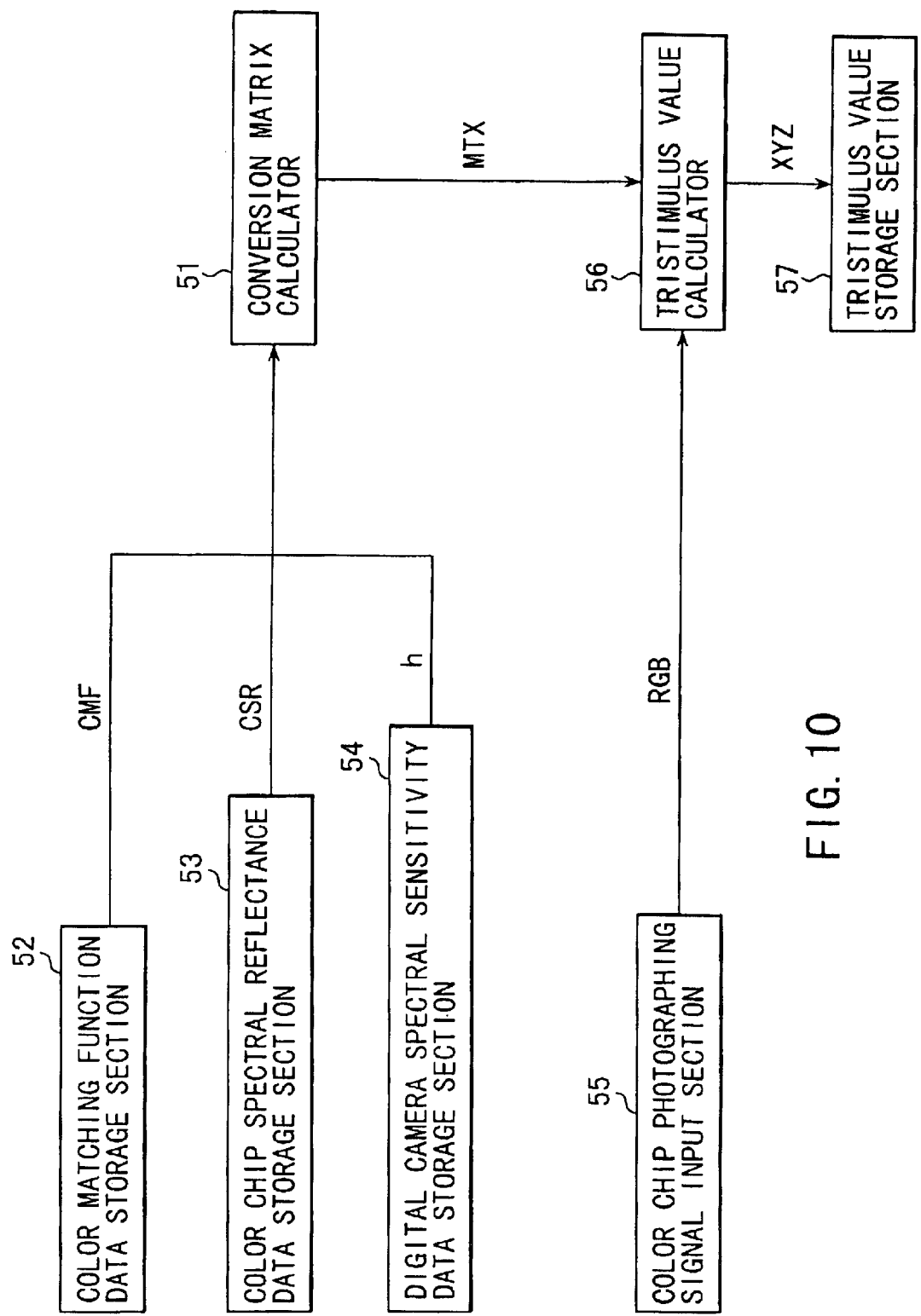
FIG. 10 is a block diagram showing the arrangement of an illumination light tristimulus value calculating/processing section in the fifth embodiment.

As a substitute for a measuring device having such special sensitivity characteristics, a combination of a color chart 39 including nine color chips whose spectral reflectances are known and a known digital camera 40 whose spectral sensitivity is known is used. The color chart 39 is placed near the CRT monitor, and the reflected light of observation illumination light reflected by each color chip is photographed by the digital camera 40. The photographing signal based on each color chip is sent to a computer 36 in a hospital 31 through a communication line 41. An illumination light tristimulus value calculating/processing section of the computer 36 in the hospital 31 calculates the tristimulus values of observation illumination light from the photographing signal based on each color chip, the spectral sensitivity data of the digital camera 40 which is stored in advance, the spectral reflectance data of each color chip, and color matching function data, and sends the tristimulus values to a computer in a clinic (not shown) through a communication line 42. FIG. 10 shows the arrangement of the illumination light tristimulus value calculating/ processing section.

A conversion matrix calculator 51 calculates a conversion matrix MTX for converting photographing signals R, G, and B of the respective color chips, which are sent from a color chip photographing signal input section 55, into tristimulus values X, Y, and Z of observation illumination light. The conversion matrix calculator 51 calculates this matrix from spectral sensitivity data h of the digital camera 40 which is stored in advance in a digital camera spectral sensitivity data storage section 54 placed in the computer 36, spectral reflectance data CSR of each color chip stored in a color chip spectral reflectance data storage section 53 in advance, and color matching function data CMF stored in a color matching function data storage section 52 in advance.

The above conversion matrix MTX is calculated by $$M = \begin{pmatrix} C_{x1} & C_{x2} & \ldots & C_{x27} \\ C_{y1} & C_{y2} & \ldots & C_{y27} \\ C_{z1} & C_{z2} & \ldots & C_{z27} \end{pmatrix}$$

$$\frac{\partial E_x}{\partial C_{xk}} = \frac{\partial E_y}{\partial C_{yk}} = \frac{\partial E_z}{\partial C_{zk}} (k = 1 - 27)$$

$$E_i = \int_{\lambda=380}^{780} \left\{ xyz_i(\lambda) - \sum_{k=1}^{27} C_{ik} S_k(\lambda) \right\}^2 d\lambda \quad (i = x, y, z)$$

$$S_k(\lambda) = k_i(\lambda) f_j(\lambda) \quad (k = k(i, j))$$

where xyzi(λ) (i=x, y, z) is a color matching function, hi(λ) (i=1 to 3) is the spectral sensitivity of the digital camera 40, and fj(λ) (j=1 to 9) is the spectral reflectance of each color chip.

The conversion matrix MTX calculated by the conversion matrix calculator 51 is sent to a tristimulus value calculator 56. The tristimulus value calculator 56 calculates the average signal value of each color chip from the color chip images input from the color chip photographing signal input section 55, and calculates the tristimulus values X, Y, and Z of observation illumination light by multiplying each average signal value by the conversion matrix MTX. The tristimulus value calculator 56 then stores the tristimulus values X, Y, and Z in a tristimulus value storage section 57.

In this embodiment, nine color chips are used. However, the number of color chips is not limited to this. In addition, a digital camera having sensitivities corresponding to three channels may be used as a multispectral camera; or digital camera having four channels or more, as on the photographing side.

If the tristimulus values of observation illumination light are measured by using a digital camera and color chips in this manner, any expensive measuring device need not be used. In addition, since the spectral sensitivity characteristics of a general digital camera generally has no linear conversion relationship with a color matching function, tristimulus values cannot be accurately measured. However, with a combination of a digital camera and color chips, tristimulus values can be measured with higher precision.

As has been described in detail above, according to the present invention, there is provided a color reproduction system which can replace measurement of an observation illumination light spectrum with simpler measurement of tristimulus values, and can perform illumination conversion that can reproduce a color of an object under an illumination light spectrum suited to color reproduction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color reproduction system comprising:
   color image input means for sensing an object;
   color estimation means for calculating tristimulus values from a color image signal obtained by the color image input means; and
   color image output means for outputting a color image signal based on a color represented by the tristimulus values obtained by the color estimation means,
   the color estimation means including:
   illumination light measuring means for measuring tristimulus values of observation illumination light,
   virtual illumination light spectrum calculation means for calculating a virtual illumination light spectrum that provides tristimulus values equal to the tristimulus values of the observation illumination light which are obtained by the illumination light measuring means, and
   tristimulus value calculation means for calculating tristimulus values of the object under the virtual illumination light spectrum from the color image signal.

2. A system according to claim 1, wherein the virtual illumination light spectrum calculation means calculates a spectrum from a linear combination of predetermined illumination light spectrum basis functions.

3. A system according to claim 1, wherein the virtual illumination light spectrum calculation means calculates a spectrum satisfying the relation that linear conversion of a product of a spectral sensitivity of the color image input means and a photographing illumination light spectrum is a product of a color matching function and the virtual illumination light spectrum.

4. A system according to claim 1, wherein the color image input means and the illumination light measuring means are positioned under different kinds of illumination light.

5. A color reproduction system which can sense a predetermined object as a color image, perform color correction of the sensed color image, and perform data transfer through a line, comprising:
   a color camera for sensing the object under photographing illumination light;
   a simplified spectrophotometer for measuring a spectrum of the photographing illumination light;
   an illumination light calorimeter for measuring tristimulus values of observation illumination light on an object observation side, and transferring the tristimulus value data of the observation illumination light to a color correction device through a line;
   a color correction device for calculating tristimulus values of the object under the virtual illumination light spectrum generated on the basis of the transferred tristimulus values of the observation illumination light, and converting the tristimulus values into a monitor signal by using monitor profile data; and
   a monitor for displaying a color image including an object image color-corrected by the color correction device.

6. A color reproduction system which can sense a predetermined object as a color image, perform color correction of the sensed color image, and perform data transfer through a line, comprising:
   a color camera for sensing the object under photographing illumination light;
   a simplified spectrophotometer for measuring a spectrum of the photographing illumination light;
   an illumination light colorimeter for measuring tristimulus values of observation illumination light on an object observation side, and transferring the tristimulus value data of the observation illumination light to a color correction device through a line;
   a color correction device for calculating tristimulus values of the object under the virtual illumination light spectrum generated on the basis of the transferred tristimulus values of the observation illumination light, and converting the tristimulus values into a monitor signal by using monitor profile data; and
   a monitor for displaying a color image including an object image color-corrected by the color correction device;
   wherein the color correction device comprises:
      a storage device storing a basis function $\rho$ of a daylight spectrum, monitor profile data MTP, color matching function data CMF, and spectral sensitivity data h of the RGB color camera in advance;
      a virtual illumination light spectrum calculator for calculating virtual illumination light spectrum data OS from tristimulus values IXYZ of observation illumination light measured by the illumination light colorimeter and the basis function $\rho$ from the storage device;
      a spectral reflectance calculator for calculating spectral reflectance data f of the object from object characteristic data $\sigma$ and the spectral sensitivity data h from the storage device, RGB image data CRGB input from the RGB color camera, and a photographing illumination light spectrum from a simplified spectrophotometer;
      a tristimulus value calculator for calculating tristimulus value data OXYZ of the object from the color matching function data CMF from the storage device, the virtual illumination light spectrum data OS from the virtual illumination light spectrum calculator, and the spectral reflectance data f from the spectral reflectance calculator; and
      an output signal calculator for calculating the RGB image data CRGB serving as the monitor signal from the monitor profile data MTP from the storage device and the tristimulus value data OXYZ from the tristimulus value calculator.

7. A color reproduction system which can sense a predetermined object as a color image, perform color correction of the sensed color image, and perform data transfer through a line, comprising:
   a color camera for sensing the object under photographing illumination light;
   a simplified spectrophotometer for measuring a spectrum of the photographing illumination light;
   an illumination light colorimeter for measuring tristimulus values of observation illumination light on an object observation side, and transferring the tristimulus value data of the observation illumination light to a color correction device through a line;
   a color correction device for calculating tristimulus values of the object under the virtual illumination light spectrum generated on the basis of the transferred tristimulus values of the observation illumination light, and converting the tristimulus values into a monitor signal by using monitor profile data; and
   a monitor for displaying a color image including an object image color-corrected by the color correction device;
   wherein the color correction device comprises:
      a storage device storing the monitor profile data MTP, a color matching function data CMF, and a spectral sensitivity data h of the RGB color camera in advance;
      a virtual illumination light spectrum calculator for calculating a conversion matrix MTX from the tristimulus values IXYZ of the observation illumination light measured by the illumination light measuring device, the monitor profile data MTP from the storage device, and the color matching function data CMF;
      a tristimulus value calculator for calculating the tristimulus value data OXYZ of the object from the conversion matrix MTX from the virtual illumination light spectrum calculator and the RGB image data CRGB input from the RGB color camera; and
      an output signal calculator for calculating RGB image data CRGB serving as the monitor signal from the monitor profile data MTP from the storage device and the tristimulus value data OXYZ from the tristimulus value calculator.

8. A color reproduction system which can sense a predetermined object as a color image, perform color correction of the sensed color image, and perform data transfer through a line, comprising:
   a color camera for sensing the object under photographing illumination light;
   a simplified spectrophotometer for measuring a spectrum of the photographing illumination light;

an illumination light colorimeter for measuring tristimulus values of observation illumination light on an object observation side, and transferring the tristimulus value data of the observation illumination light to a color correction device through a line;

a color correction device for calculating tristimulus values of the object under the virtual illumination light spectrum generated on the basis of the transferred tristimulus values of the observation illumination light, and converting the tristimulus values into a monitor signal by using monitor profile data; and a monitor for displaying a color image including an object image color-corrected by the color correction device;

wherein the color correction device comprises:

a storage device storing object characteristic data σ, monitor profile data MTP, color matching function data CMF, standard illumination light spectrum data SS, tristimulus values JXYZ of standard illumination light, and spectral sensitivity data h of the RGB color camera;

a spectral reflectance calculator for calculating spectral reflectance data f of the object from the object characteristic data σ and spectral sensitivity data h from the storage device, RGB image data CRGB input from the RGB color camera, and photographing illumination light spectrum data MS from the simplified spectrophotometer;

a tristimulus value calculator for calculating tristimulus values SXYZ of the object under standard illumination light from the spectral reflectance data f from the spectral reflectance calculator and the color matching function data CMF and standard illumination light spectrum data SS from the storage device;

a corresponding color calculator for calculating tristimulus values CXYZ of a corresponding color of the object from the tristimulus values SXYZ from the tristimulus value calculator, tristimulus values JXYZ of standard illumination light from the storage device, and tristimulus values RXYZ of observation illumination light from the illumination light calorimeter; and an output signal calculator for calculating RGB image data CRGB serving as the monitor signal from the tristimulus values CXYZ from the corresponding color calculator and the monitor profile data MTP from the storage device.

9. A system according to claim 5, wherein the system comprises a plurality of color chips, each having a known spectral reflectance, and a digital camera having a known spectral sensitivity, and wherein the color chips are arranged near the monitor and reflected light of observation illumination light reflected by each color chip is photographed by the digital camera, thereby calculating tristimulus values of the observation illumination light from a photographing signal of each color chip which is obtained by photographing, spectral sensitivity data of the digital camera, spectral reflectance data of each color chip, and color matching data.

* * * * *